Dec. 27, 1938.  P. R. FECHHEIMER ET AL  2,141,241
EFFECTING CLOSURES IN COLLAPSIBLE TUBES BY WELDING
Filed June 30, 1936   4 Sheets-Sheet 2

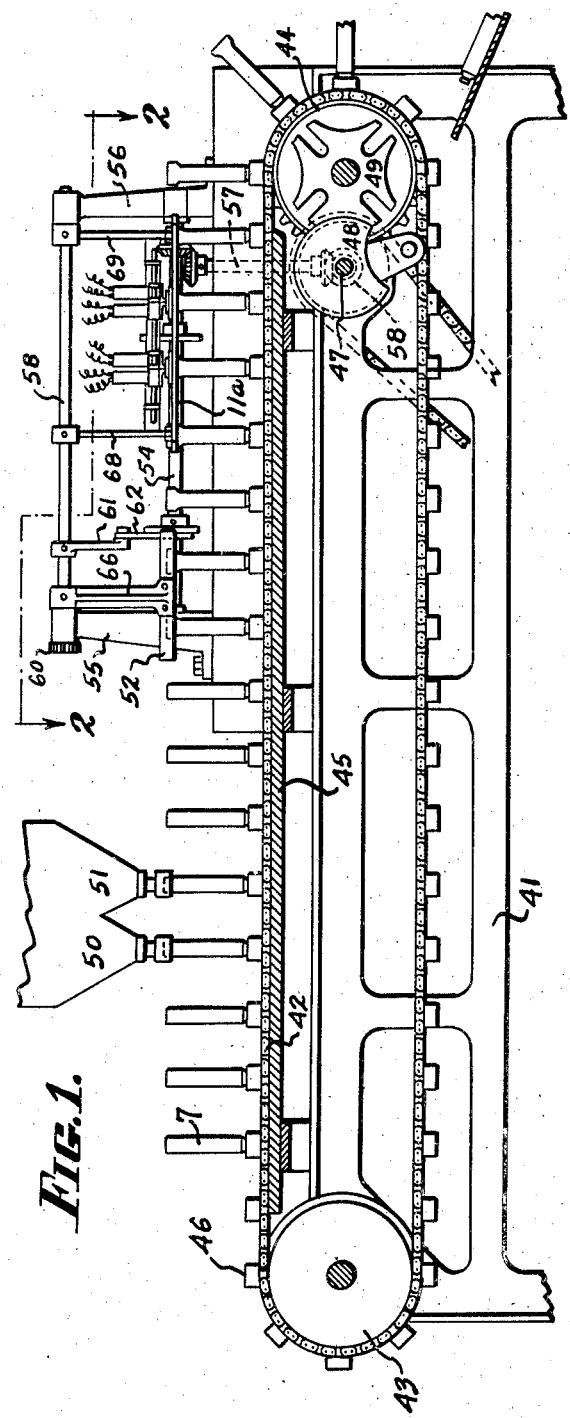

INVENTORS.
PAUL R. FECHHEIMER
AND MERVIL HALLEAD.
BY
Allen & Allen
ATTORNEYS.

Dec. 27, 1938.   P. R. FECHHEIMER ET AL   2,141,241
EFFECTING CLOSURES IN COLLAPSIBLE TUBES BY WELDING
Filed June 30, 1936   4 Sheets-Sheet 3

INVENTORS.
PAUL R. FECHHEIMER
AND MERVIL HALLEAD.
BY Allen & Allen
ATTORNEYS.

Dec. 27, 1938.   P. R. FECHHEIMER ET AL   2,141,241
EFFECTING CLOSURES IN COLLAPSIBLE TUBES BY WELDING
Filed June 30, 1936   4 Sheets-Sheet 4

INVENTORS.
PAUL R. FECHHEIMER
BY AND MERVIL HALLEAD.
Allen & Allen ATTORNEYS.

Patented Dec. 27, 1938

2,141,241

UNITED STATES PATENT OFFICE 2,141,241

EFFECTING CLOSURES IN COLLAPSIBLE TUBES BY WELDING

Paul R. Fechheimer and Mervil Hallead, Cincinnati, Ohio, assignors to The Karl Kiefer Machine Company, Cincinnati, Ohio, a corporation of Ohio Application June 30, 1936, Serial No. 88,186

12 Claims. (Cl. 113—59)

Our invention constitutes an improvement on the method and means set forth in the copending application of Paul R. Fechheimer, Ser. No. 710,824, filed February 12, 1934. That invention and the present one both have to do with the sealing of collapsible tubes or like articles by fusion or welding of the wall portions thereof. Both inventions have to do, so far at least as a common process aspect of them is concerned with the effecting of a welded closure by means of a heating or welding element which is brought against the juxtaposed walls of the container and is moved relatively to such walls, whereby the weld is effected in a progressive manner, a procedure which has been shown to have a number of advantages.

The objects of the present invention are to provide a method and means which have certain advantages over the simplified procedure aforesaid, and which have been shown in commercial practice to have enhanced results. In particular in the procedure and mechanism of this invention a divided heating element is brought against the juxtaposed walls of the tube at or near the central portion of the pinched or fishtailed end, and the two parts of the heating element are caused to move away from each other, thus effecting a progressive weld from the central portion of the juxtaposed walls outwardly toward the corners thereof. We have found this method very positive in producing tight seals since there is no opportunity for a failure to make a tight closure at the beginning of the welding operation. There is a slight tendency for the molten metal to follow the heating or welding tool if the welding is started by a moving tool having a wiping action, so that in a few instances under the simplified previous procedure absolute gas tightness was not achieved at the corner of the juxtaposed walls where the welding operation began, although the said simplified process was entirely operative from the standpoint of making satisfactory closures and in almost all instances effected a gas tight closure. In the procedure of the present invention, gas tight closures are uniformly obtained because the metal is first fused by a tool which comes down on the work and melts it without wiping action, after which the fusion is progressive, but in the presence of a pool of molten metal. Also, generally, we have achieved tighter welds by the present process and there is less tendency for the metal to string at the corners.

The various objects of our invention, including those which have already been set forth and others which will be apparent to one skilled in the art upon reading these specifications, we accomplish by that certain construction and arrangement of parts and in that process of which we shall now describe two exemplary embodiments, the one being a machine designed for individual operations on tubes individually inserted therein, and the other being a continuous machine of the tandem type operating in connection with filling mechanism for the tubes.

In the drawings:

Figure 1 is an elevational view with certain parts cut away of the last mentioned machine.

Fig. 2 is a plan view with parts in section of a portion of the machine of Fig. 1, as indicated by the lines II—II therein.

Figure 7:
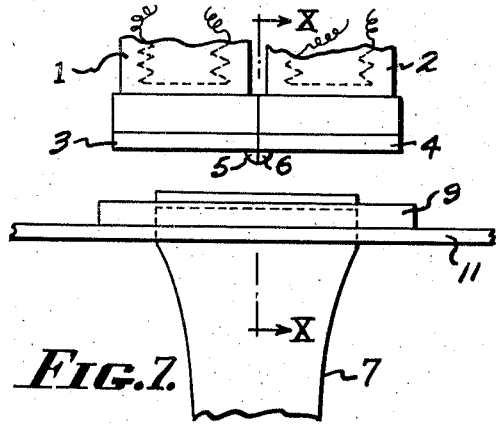
Figs. 7, 8 and 9 are semi-diagrammatic illustrations of various steps in the welding procedure.
Figure 10:
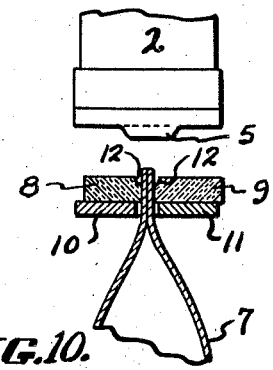
Fig. 10 is a sectional view taken along the lines X—X of Fig. 7.
Figure 8:
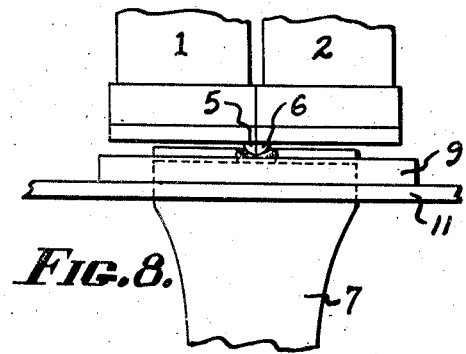
Figure 9:
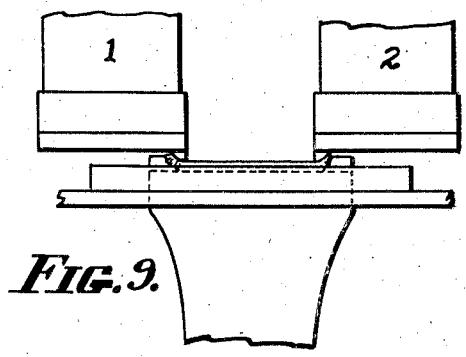
Figure 13:
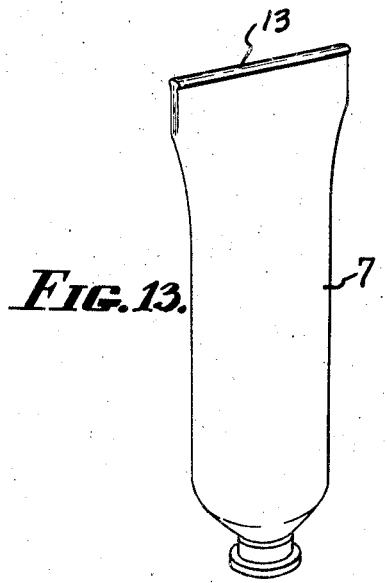
Fig. 13 is a perspective view of a collapsible tube which has been filled, and which has been sealed by our process.
Figure 11:
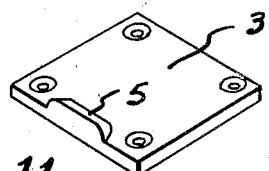
Fig. 11 is a perspective view of one of the heating or welding shoes.
Figure 12:
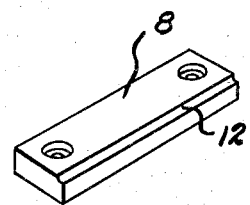
Fig. 12 is a perspective view of one of the insulative clamping shoes.

The general procedure of welding will be taken up first, with reference to Figs. 7 to 9 inclusive. We have indicated in these figures, a pair of heating elements 1 and 2, preferably though not necessarily, electrical heating elements. These elements terminate in heating shoes indicated at 3 and 4, which shoes have depending heating lips 5 and 6, which may be and preferably are of quarter-round section. At the start of the welding operation, the heating shoes are close together, as shown in Fig. 7, so that the lips form an effective heating element of semi-circular cross section. The collapsible tube 7 with its end pinched or fishtailed as shown, is clamped between a pair of clamping plates 8 and 9. These plates are preferably of heat insulative substance, although not necessarily so. They are attached to suitable supporting means 10 and 11, and as clearly shown in Fig. 10, they are provided near their upper edges with a groove or rabbet 12. Thus a trough is formed to accept the molten metal and to assist in the production of a bead. At the start of the welding operation the two elements 1 and 2 are brought down at or near the center of the fishtailed portion of the tube, as shown in Fig. 8. The lips 5 and 6 melt the metal of the tube walls and the walls become fused together. Then the elements 1 and 2 are rapidly moved apart, as shown in Fig. 9, melting additional portions of the tube walls as they move, so that the weld is formed progressively from the center outwardly. The molten metal collects in the groove or rabbet 12 which helps to form the bead 13, as shown in Fig. 13, although the regularity of this bead is largely due to surface tension in the molten metal. The movement of the elements 1 and 2 apart is continued until they lie off the corners of the fishtailed portion of the tube, when the weld is complete and the tube may be removed from between the clamping plates 8 and 9.

The various steps to which we have referred are preferably carried on by mechanism in timed and rapid sequence. Reference to Figs. 3 to 6 inclusive will show a type of device for sealing one inserted tube at a time. The device comprises a frame or bed 14 to which there is pivoted an over frame 15 on brackets 16. The heating elements 1 and 2 are mounted in this frame on rods 17 and 18. As shown, the element 1 is fastened to the rod 18, while the element 2 is fastened to the rod 17. The element 1 is free to slide on the rod 17 as is the element 2 on the rod 18. These rods are slidably mounted in the arms of the over frame 15, as shown. A compression spring 19 engages between the end of the rod 17 and one of the arms of the frame, and a tension spring 20 engages between the frame and the rod 18, whereby the heating elements 1 and 2 are urged together. The rods bear respectively roller members 21 and 22 which engage cams 23 and 24 mounted upon a shaft 25, journaled in a bearing member 26 on the base. This shaft may be driven in any suitable way, a chain and sprocket drive being shown. The general shape of the cams is shown clearly in Fig. 4, and it will be clear that upon rotation of the shaft 25 the rods 17 and 18 may be actuated thereby to move the heating elements 1 and 2 together or apart as in the welding operation which we have described above.

To raise the heating elements away from the work or to bring them in contact with the work an arrangement is made to swing the over frame 15 on its pivots. In the embodiment shown, this arrangement comprises an arm 27 attached to the underframe and bearing against another cam 28 on the shaft 25.

The supporting means 10 and 11 for the insulative clamping members 8 and 9 are in the form of bars pivoted at one end to a bracket 29 on the base and having a sliding mounting at the other end in a bracket 30. A tension spring 31 engaging between ears 32 and 33 on the bars (see Fig. 5) may be used to urge the two bars together. Operating means for the two bars may comprise a fourth cam 34 also mounted on the shaft 25, and a pair of rollers 35 and 36 on the bars. The cam 34 is a circular cam which, however, varies in thickness. When the thicker portion or portions of this cam lie between the rollers 35 and 36, the bars 10 and 11 are caused to swing away from each other on their pivots, and when the thinner portion or portions of this cam lie between the rollers, the bars are caused to come together under the influence of the spring 31, whereby the clamping plates are brought against the tube end.

Figure 3:
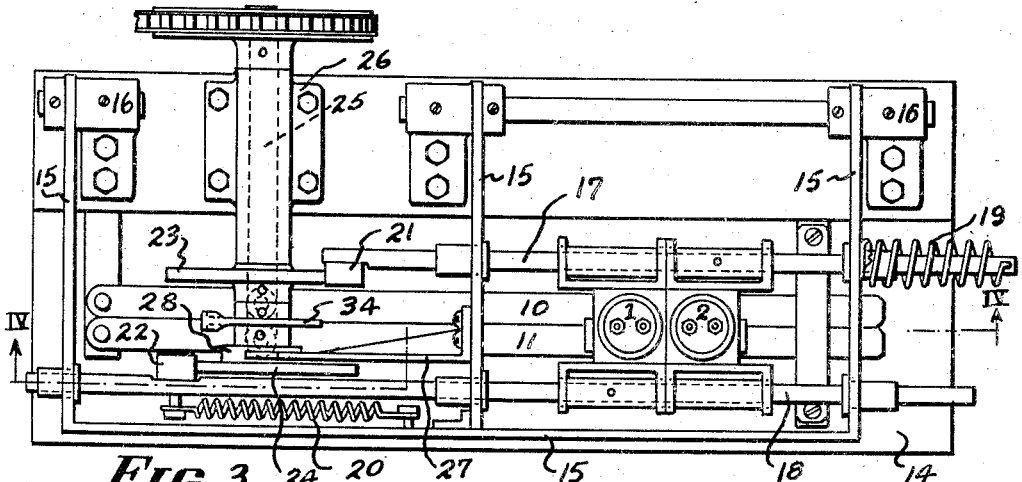
Fig. 3 is a plan view of the individual unit device.
Figure 4:
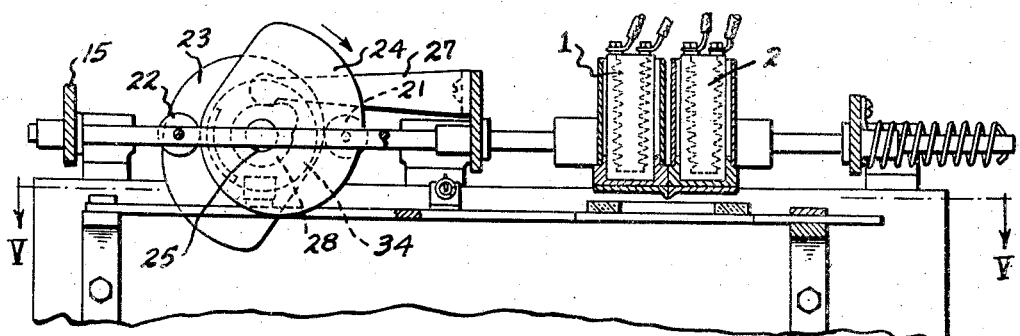
Fig. 4 is a vertical sectional view thereof taken along the lines IV—IV of Fig. 3.
Figure 5:
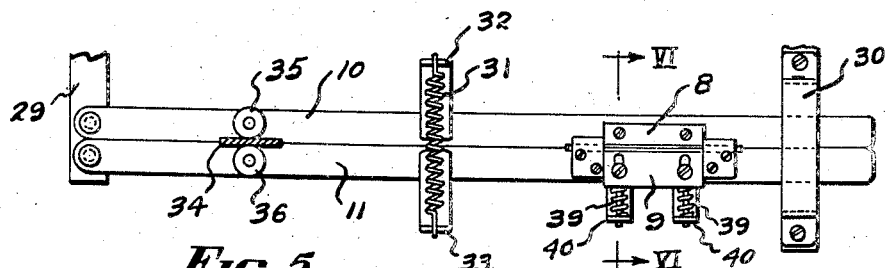
Fig. 5 shows the clamping mechanism of the device of Fig. 4, and is a view taken along the lines V—V of said figure.
Figure 6:
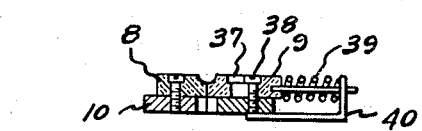
Fig. 6 is a sectional view of the clamping mechanism taken along the lines VI—VI of Fig. 5.

We have found it advantageous to mount one of the clamping plates at least resiliently on its bar. In Figs. 5 and 6, while the plate 8 is shown solidly bolted to the bar 10, the plate 9 is shown solid as at 37, and slidably mounted on bolts 38. One or more compression springs 39 bear against the plate 9 and against bracket-like abutments 40 attached to the bar 11. Thus the device can accommodate tube ends of varying thickness and an even pressure on the tube ends is assured.

In Figs. 1 and 2, we have indicated a combination filling and sealing machine in which on the frame 41 a conveyor 42 is mounted on their sheaves 43 and 44. The upper flight of this conveyor may be supported by a track 45. The conveyor carries at intervals holders 46 for collapsible tubes. A main drive shaft 47 is provided, and coupled to motive means in any suitable way. A Geneva movement comprising the members 48 and 49 may be employed to give the conveyor a step-by-step motion. The collapsible tubes 7 are loaded into the conveyor holders 46 by hand or machinery, pass along the conveyor and are first filled by filler heads 50 and 51. Proceeding further they are pinched or fishtailed and then sealed as we have described. The pinching is done by a pair of jaws shown at 52 and 53, preferably of such a length as to pinch two of the tubes at one time. The particular machine is designed to fill, pinch and seal two tubes simultaneously. In modifications of the machine for operating simultaneously upon one tube or more than two tubes, modifications in the units to this end will be within the skill of the worker in the art in the light of our disclosure.

For driving the pinching and sealing mechanism we make use of a line shaft 54, journaled in bracket bearings 55 and 55a on the frame 41 and driven through bevel gears 56 from a vertical shaft 57. This shaft in turn is connected by bevel gears 58 from the main drive shaft 47. Any other suitable drive of course may be employed; but it is essential that some means be employed to operate the pinching and sealing mechanism in timed sequence to the movements of the conveyor and the operation of the filling mechanism. A pair of shafts 58 and 58a are journaled in extensions of the bracket bearings 55 and 55a so as to overlie the conveyor. These shafts are connected together by gears 59 and 60 so that rotation of one of the shafts will cause the other of the shafts to rotate in the opposite direction. The shaft 57 is provided with a lever 61. A link 62 is slotted at one end and so mounted that the shaft 54 passes through the slot. The other end of the link is connected to the lever arm 61. The link bears at its outer end a stud or roller 63 which bears against a cam 64 on the shaft 54; and the link 62 may be confined between the cam and a collar 65. As the shaft 54 rotates, the cam will thus cause the shaft 57 to rock and this in turn will rock the shaft 58 in the opposite direction through the gears 59 and 60. The return of the shafts to normal position may be accomplished either by springs or by the cam 64.

The pinching or fishtailing jaws 52 and 53 are mounted respectively to the shafts 58 and 57 by means of arms 66 and 67. Likewise, the supporting rods 10a and 11a for the clamping plates 8 and 9 are fastened to the shafts 56 and 57 by means of arms 68 and 69, shown in Fig. 1 but not shown in Fig. 2.

The heating units 1, 2, 1a and 2a are mounted in this instance in an over frame comprising a pair of arms 70 and 71 affixed to a shaft 72 journaled in bracket bearings 73 and 74. The arm 70 has an extension 75 bearing a stud or roller 76 which engages a cam 77 mounted on the shaft 54. The operation of this cam is to rock the over frame comprising the arms 70 and 71 on its pivots, thereby effectively raising and lowering the heating elements with respect to the work. A pair of rods 78 and 79 are slidably mounted in the arms 70 and 71. A bracket member 80 is shown as slidably mounted on the shaft 72, as slidably mounted on the rod 78, as carrying the heating element 1 and as affixed to the rod 79. Another bracket member 81 is shown as slidably mounted on the shaft 72, as affixed to the shaft 78 and as slidably mounted on the shaft 79. The heating element 2 is shown as affixed to the shaft 78 and slidably mounted on the shaft 79. The heating element 1a is shown as slidably mounted on the shaft 78 and as affixed to the shaft 79. Thus, as will be clear upon movement of the bracket members 80 and 81 away from or toward each other, the pairs of heating elements 1, 2 and 1a, 2a respectively are caused to diverge or converge simultaneously, treating two of the pinched or fishtailed tubes 7. A tension spring 82 may be employed to cause the bracket members 80 and 81 to converge, and the bracket members may be provided with rollers 83 and 84 engaging a cam member 85 affixed to the shaft 54. The various cams on the shaft 54 are so proportioned and indexed that the various pinching, clamping and sealing operations heretofore described are carried on rapidly and in timed sequence.

Figure 14:
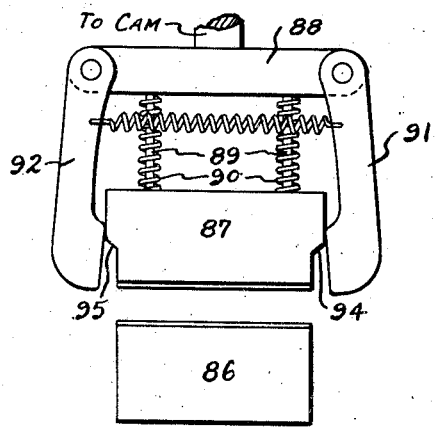
Fig. 14 shows a clamping device having end jaws in the open position.
Figure 15:
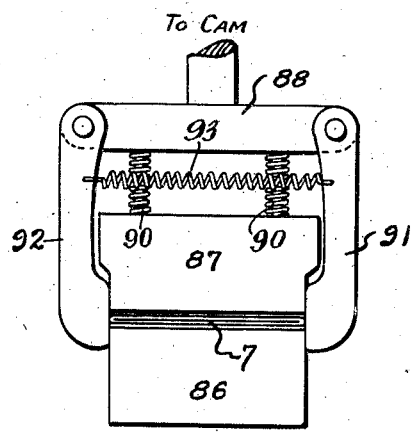
Fig. 15 shows the same device in clamping position.

In Figs. 14 and 15 we have shown an alternative form of clamping means based upon our discovery that the provision of means to engage the ends of the tubes during sealing is effective in preventing stringing of the molten metal at the sealed corners of the tube. In these figures we have shown one of the clamping members 86 for the fishtailed portion of a tube during sliding. This jaw may be thought of either as a stationary jaw or as one operated by a cam as hereinbefore described. The other jaw is indicated at 87 and is held to an operating member 88 by means of rods 89 on which it is slid. It is urged away from the operating member by suitable resilient means such as compression springs 90, coiled about the rods. Pivoted to the ends of the operating member are two end clamping members 91 and 92. These members are urged toward each other as by means of a tension spring 93. The ends of the clamping member 87 are provided with shoulders 94 and 95, on which the clamping members 91 and 92 may ride up so as to separate them when the clamping structure is in the open position as shown in Fig. 14. When the clamping structure is in the closed position as shown in Fig. 15, the tension spring 93 acts to draw these clamping members against the ends of a fishtailed tube 7, as shown, the clamping member 87 having moved toward the operating member 88, so that the shoulders no longer engage the end clamping members.

Figure 16:
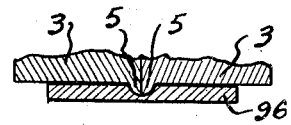
Fig. 16 is a sectional view showing the relationship of the heating elements to a wiping device.
Figure 17:
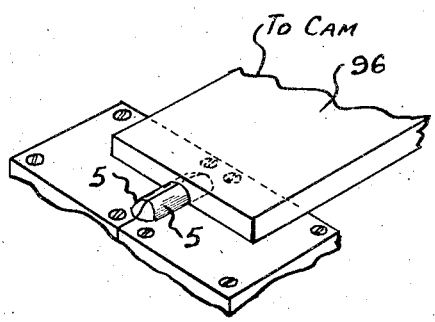
Fig. 17 is a plan view thereof.

We have also found it advantageous to wipe the operating faces of the heating elements after each operation, so as to dislodge therefrom any portions of metal which may cling to them and in particular any portions of oxidized metal or dross, since these appear to interfere with the sealing of the tubes. To this end, we have shown in Figs. 16 and 17, the end members 3 of the sealing element in relation to a wiping element 96, which may be a seal member shaped to fit the sealing portions 5. The wiping element 96 may be attached to or form part of a rod, suitably mounted for sliding operation and extending into contact with a cam which reciprocates it as will be readily understood. In operation the cam moves the wiping element 96 across the sealing face 5, after the completion of each sealing operation.

While we have shown two exemplary embodiments of our invention, it will be understood that other embodiments may be made without departing from the spirit of it.

Having thus described our invention, what we claim as new and desire to secure by Letters Patent, is:

1. A process of sealing collapsible tubes by fusion, which comprises fusing first an intermediate area of juxtaposed wall portions of the container and carrying the fusion of the metal progressively out to the corners of said juxtaposed wall portions.

2. A method of sealing collapsible tubes which comprises pinching the end of a collapsible tube to bring wall portions thereof into juxtaposition, bringing down against an intermediate portion of said juxtaposed walls a pair of heating elements in close proximity so as to fuse the metal, and thereupon moving said heating elements divergingly so as to carry the fusion of said metal out to the corner portions of said juxtaposed walls.

3. A process of sealing collapsible tubes which comprises pinching an end portion of a tube so as to bring the walls thereof into juxtaposition, clamping said walls between members beyond which the juxtaposed ends of said walls project slightly, and melting the projecting ends of said walls, the said clamping means being rabbeted adjacent the projecting portions of said walls, and carrying on the fusion of said metal in such a way that the rabbet is filled by molten metal for the production of a fused bead, and accomplishing the fusion of said metal by melting the projecting wall portions first, intermediate the corners thereof, and then progressively outwardly to said corners.

4. In a sealing means for collapsible tubes, a pair of heating elements adapted to be brought into close juxtaposition and moved apart, means for bringing said heating elements into contact with juxtaposed wall portions of a collapsible tube intermediate the corners thereof, whereby to melt the metal of said walls and means for progressively moving said heating elements apart, whereby the melting of said metal is carried progressively out to said corners.

5. In combination in a tube sealing device, a pair of heating elements adapted to be moved relative to each other, a heating shoe on each of said elements, heating lips on said heating shoes adapted when said elements are close together to lie substantially against each other and to be brought into contact with work in that position, and means for moving said heating elements relative to each other.

6. In a tube sealing device clamping means and sealing means, said sealing means comprising a pair of heating elements adapted to come substantially together in one position and adapted for relative divergent motion, means for operating said clamping means, means for bringing said sealing means into contact with a work piece, and means for producing relative motion of said heating means.

7. In a tube sealing device clamping means and sealing means, said sealing means comprising a pair of heating elements adapted to come substantially together in one position and adapted for relative divergent motion, means for operating said clamping means, means for bringing said sealing means into contact with a work piece, means for producing relative motion of said heating means, and means for operating said several means in timed sequence.

8. In a tube sealing mechanism, pinching means, clamping means and sealing means, said sealing means comprising a pair of heating elements, means for moving said elements as a unit, means for moving said elements oppositely to each other, and operating means for actuating said aforementioned means in timed sequence.

9. In combination in a tube sealing mechanism pinching means, clamping means and sealing means, said sealing means comprising a pair of heating elements, means for moving said elements as a unit, and means for moving said elements oppositely to each other, a common shaft, cam means on said shaft and fingers operatively connected to said several elements, whereby said cam means upon movement of said shaft serve to operate said several elements in timed sequence.

10. In a tube sealing mechanism the combination of at least one pair of heating elements, a frame, slidable means in said frame to which said heating elements are respectively attached, means for operating said sliding elements to move said heating elements together or apart, and means for moving said frame so as to move said heating elements as a unit toward or away from a work piece.

11. A process of sealing thin walled collapsible tubes which comprises disposing end wall portions of a tube in juxtaposition and clamping said wall portions between members beyond which the ends of said juxtaposed wall portions project, the said clamping members being rabbeted adjacent the projecting end portions of said tube so as to form a groove, and melting the projecting portions of said walls in such a way that molten metal derived from said projecting end portions of the tube collects in said groove, said clamping means being of insulative substance, whereby the end wall portions of said tube are fused together and a bead is formed thereon of rounded character due to surface tension, the insulative character of said clamping means being such as to permit the maintenance of molten metal in said groove for a sufficient length of time to form a bead of such character.

12. A process of sealing thin walled collapsible tubes by fusion of the metallic walls thereof, which comprises juxtaposing wall portions of a tube to be sealed, clamping said juxtaposed portions so that the parts to be melted for fusion extend beyond the clamping means, said clamping means being of insulative substance and being rabbeted adjacent said extending portions so as to form a groove, closing the ends of said groove sidewise of said juxtaposed wall portions by endwise disposed members, and fusing said wall portions by bringing thereagainst an element to impart heat thereto so as to cause molten metal to lie in said groove for the formation of a bead.

PAUL R. FECHHEIMER.
MERVIL HALLEAD.